No. 802,766. PATENTED OCT. 24, 1905.
H. C. MALLORY.
PROCESS FOR HEATING APARTMENTS, &c.
APPLICATION FILED SEPT. 20, 1902.

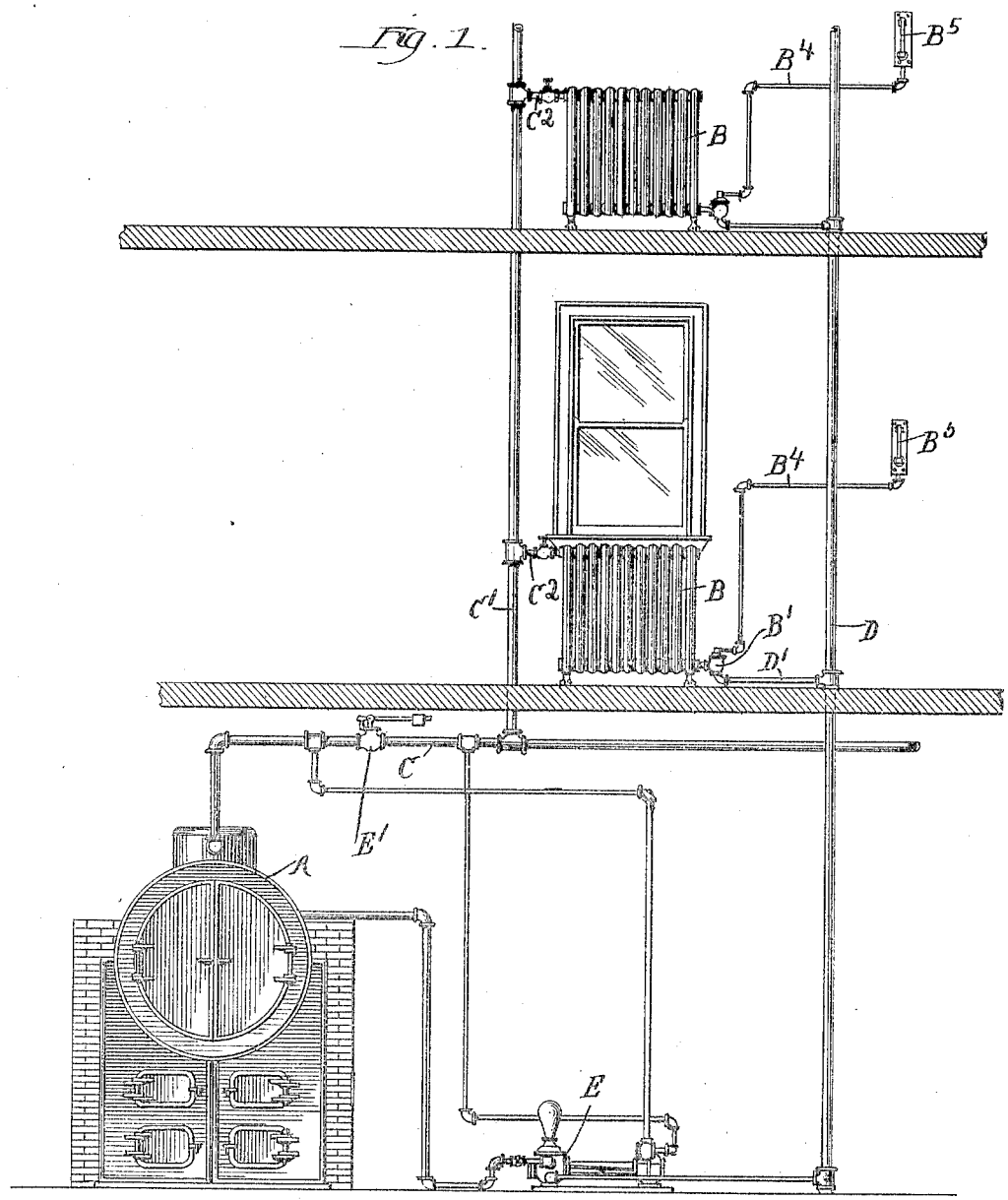

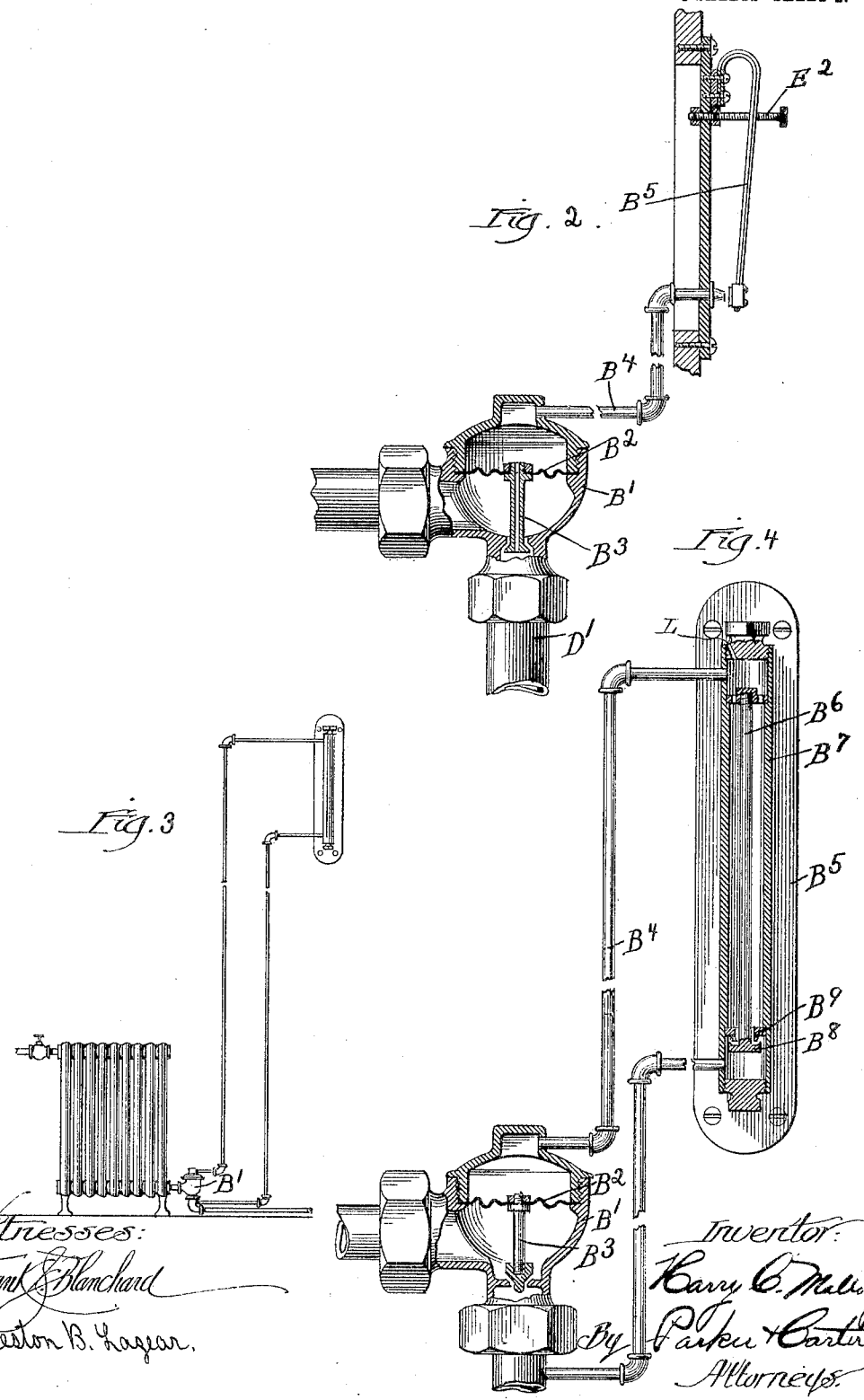

3 SHEETS—SHEET 3.

Witnesses:
Frank P. Blanchard
Weston B. Hazear

Inventor:
Harry C. Mallory.
By Parker & Carter
Attorneys

UNITED STATES PATENT OFFICE.

HARRY C. MALLORY, OF NEW YORK, N. Y.

PROCESS FOR HEATING APARTMENTS, &c.

No. 802,766. Specification of Letters Patent. Patented Oct. 24, 1905.

Application filed September 20, 1902. Serial No. 124,150.

*To all whom it may concern:*

Be it known that I, HARRY C. MALLORY, a citizen of the United States, residing at New York, in the county of New York and State of New York, have invented a certain new and useful Improvement in Processes for Heating Apartments, &c., of which the following is a specification.

My invention relates to new and improved processes for heating apartments, &c., and has for its object to provide a new and improved process of this description.

My invention is illustrated in the accompanying drawings, wherein—

Figure 5:
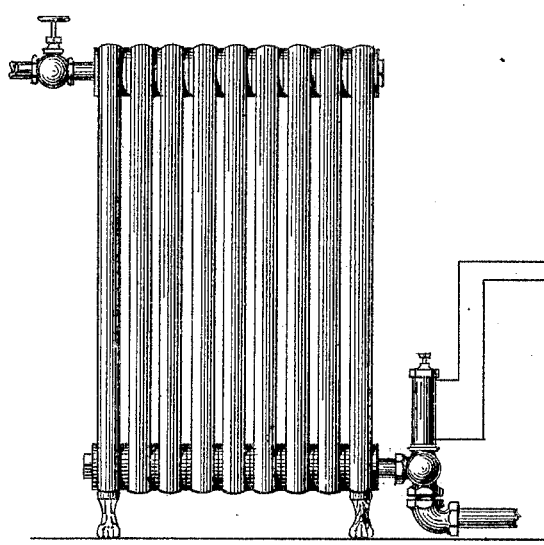
Figure 6:
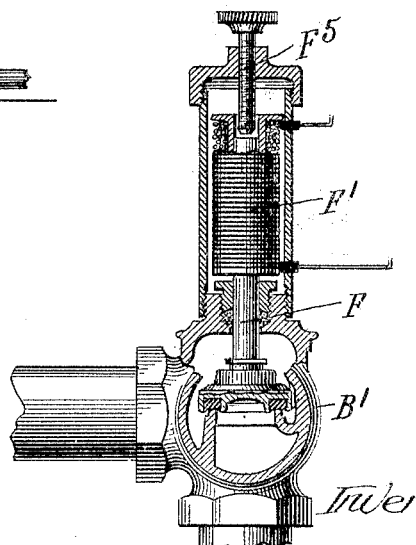

Figure 1 is a diagrammatic view showing one form of apparatus by which my invention may be utilized. Fig. 2 is a view in part section, with parts omitted, showing one form of controlling-valve for the heater. Fig. 3 is a view showing another form of controlling-valve. Fig. 4 is an enlarged view, in part section, showing the controlling-valve illustrated in Fig. 3. Fig. 5 is a view showing an electrically-controlled valve for the heater. Fig. 6 is a sectional view of the valve shown in Fig. 5.

Like letters refer to like parts throughout the several figures.

One of the objections to the use of steam for heating purposes is the necessarily high temperatures accompanying its use. These high temperatures have been avoided by the use of hot water as the heating fluid; but while the desired low temperature is secured by this means the application of hot water as heretofore used for heating purposes is very limited and its use is attended with many disadvantages. Among the disadvantages accompanying the use of hot water may be mentioned the necessity of circulation of the water, the inability to properly regulate the temperature of the apartment, and the lack of economy due to certain features, among which is the power required to produce the circulation. Another objection to the ordinary hot-water plant is the excessive first cost, due to the large amount of radiating-surface required.

One of the objects of my invention is to secure the low temperature of hot-water heating without the disadvantages ordinarily attending its use and to also secure complete control of the system and provide a heating apparatus of great economy and adaptability, by means of which the temperature of the apartment may be easily and satisfactorily regulated.

In carrying out my process the water is converted into steam, so that it is easily handled and controlled and so that it circulates of itself through the pipes of the system and to the heaters where the water is to be used. The steam when it reaches the heater is condensed into water, which partially or wholly fills the heater, and is then utilized for the purpose of heating the apartment, the amount of course depending upon the conditions met with. The amount of this water of condensation is regulated automatically, and there is produced what may be called a "graduated" temperature in the heater, and the desired temperature of the apartment may thus be secured. It is of course evident that my process may be carried out in various ways and by various appliances.

Referring now to the drawings, where for purposes of illustration I have shown a simple apparatus for carrying out my process, I first convert the water into steam in the boiler A or some similar or suitable appliance. The steam generated is then conducted to the heaters B by means of suitable mains C and risers C'. The heaters are connected at the top to the risers by the connecting-pieces $C^2$, which form steam-inlets, both entering and opening into the heaters near the top. The other ends of the heaters near the base are connected to the return-pipe D by means of the connection D'. The return-pipe may be connected with some suitable withdrawing or exhaust device or may simply discharge into the air or may be arranged in any other suitable manner. As shown in Fig. 1, the return-pipe is connected with the pump E for this purpose, which also forces the water back into the boiler. When the pump or other device of this nature is operated from the boiler generating the steam, it will be necessary to have a higher pressure than would otherwise be the case, and in this event I prefer to place a reduction-valve E' at some convenient point to reduce the pressure of the steam admitted to the system. A controlling-valve B' is associated with the heater, and this valve may be of any construction and operated in any suitable manner.

When the system is started up, the apartment, for example, is cold. The steam from the boiler passes up through the mains and risers and enters the heaters at the top thereof.

The steam is then condensed into water, which trickles down the inner face of the heater and settles to the bottom because of its weight. The valves B' prevent the water from passing out of the heaters, and each heater becomes partially or wholly filled with this water, the amount of water depending, of course, upon the conditions attending the use of this process. The steam when converted into water gives out a large amount of heat because of the latent heat absorbed in converting the water into steam, and thus the room, which is cold at this time, is rapidly brought to the desired temperature. When the heater becomes partially filled with water, this water gives out its heat and heats the apartment. The heat is thus gradually abstracted from the water and its temperature reduced to an amount depending upon the temperature desired in the apartment. The heater thus becomes partially or wholly filled with water at a much lower temperature than steam, thus giving out a gentle heat. The steam in the meantime is gradually condensed, and the water trickling down the inner face of the heater reaches the surface of the water already therein. As this water is of a higher temperature than the water at the bottom of the heater, it keeps its place at the top, and thus the column of water in the heater decreases in temperature from the top toward the bottom, there being no circulation because of the conditions presented. When the water becomes too cool to keep the temperature of the apartment at the desired point, the colder water is discharged by the automatic opening of the valve B', as is hereinafter explained, and its place will be taken by the hotter water produced by the condensed steam. It will thus be seen that the heater may be filled to the desired amount with water of the desired low temperature and that a sufficient amount of water of the desired temperature may be kept in the heater to secure the low and desirable temperatures required in the apartment. The temperature of the apartment can thus be regulated by varying the quantity of water permitted to accumulate in the heater. If, for example, the weather is mild, the heater may be permitted to entirely fill with water, so that no steam can enter therein. When this water has become so cold that it is not sufficient to maintain the required temperature in the apartment, a portion of the colder water at the bottom can be drawn off, and the condensed steam then supplies another quantity of water of a higher temperature at the top. On the other hand, if the weather is very cold, the heater may be allowed to only partially fill with water, the remaining portion being occupied with steam. Under these conditions the colder water at the bottom will be drawn off as required to maintain the proper temperature in the apartment and the steam and the water of various temperatures may be kept in such relation as to secure the desired temperature of the apartment.

I have illustrated in the drawings several constructions for automatically controlling the discharge of the water by the variations in the general temperature of the apartment. As shown, for example, in Figs. 1 and 2, the valve B' is provided with an elastic or flexible diaphragm $B^2$, to which is connected the part $B^3$, which controls the passage-way leading from the valve. When this construction is used, the pipe D' is connected with a withdrawing or exhaust device and the part $B^3$ is provided with an opening or passage-way, by means of which the pipe D' is connected with the chamber on the other side of the diaphragm $B^2$. A pipe $B^4$ connects with the chamber of the valve above the diaphragm $B^2$ and has its other end located at some convenient point. Associated with the end of the pipe $B^4$ is a thermostat or the like $B^5$. This thermostat may be of any suitable construction, and I have only attempted to show a simple device for this purpose. The thermostatic device $B^5$ is arranged so as to open and close the opening in the pipe $B^4$ and is preferably adjustable, so that it may be made to operate at different temperatures—as, for example, by the adjusting-screw $E^2$. When the apartment is too cold, for example, the thermostatic device is in such position that the pipe $B^4$ communicates with the external atmosphere. Under these conditions the part $B^3$ is so positioned that the passage-way from the heater to the return-pipe is open, for the suction of the withdrawing device equalizes the pressures in the two chambers of the valve B'.

When the temperature rises to such a point that the thermostatic device closes the opening in the pipe $B^4$, a partial vacuum is formed in the upper chamber of the valve B', and hence the diaphragm is forced upwardly, so that the part $B^3$ engages its seat and closes the connection between the heater and the return-pipe. The water now accumulates in the heater, and when the temperature of the apartment falls below a predetermined point the pipe $B^4$ is opened and the pressures equalized, so that the part $B^3$ opens the connection between the heater and the return-pipe, thus permitting some of the water to escape. As the temperature again rises the pipe $B^4$ is closed and the flow of water stopped. I prefer to have the opening past the part $B^3$ very small, so that when open only a small amount of water can pass therethrough, thus permitting the thermostat to respond before too much water has been withdrawn. Such arrangement and construction will of course depend upon the conditions presented.

In Figs. 3 and 4 I have shown another arrangement for automatically controlling the temperature. In this construction the valve B' is provided with the diaphragm $B^2$ and part $B^3$; but said part is of a somewhat different form. The thermostatic device $B^5$ is located at some convenient point, and there is a pipe or connection $B^4$ on each side of the diaphragm $B^2$, so as to connect both sides of this diaphragm. At some intermediate point in the pipe $B^4$ is an obstruction or valve or the like controlled by the thermostat, by means of which the communication between the two sides of the diaphragm is opened or closed. As herein shown, the thermostat comprises two members $B^6$ and $B^7$ of different coefficients of expansion. The member $B^7$ is perfectly hollow, and the pipe $B^4$ is broken, said member being inserted therein. The member $B^6$ is adjustably connected with the member $B^7$, so that it may be adjusted for different temperatures. It is of course evident that this construction may be varied, if desired. The member $B^6$ is provided with a part $B^8$, which engages a part $B^9$, so as to close the passageway under predetermined conditions.

When the temperature in the apartment is too low, the parts are, for example, in the position shown in Fig. 4. The withdrawing device under these conditions withdraws the air from above the diaphragm $B^2$, and it is forced upward, so as to open the connection from the heater to the return-pipe. When the temperature rises to a predetermined point, the member $B^7$, which expands more than the member $B^6$, brings the parts $B^8$ and $B^9$ together and closes the connection between the withdrawing device and the upper chamber of the valve $B'$. The natural leak or a leak-hole L provided for this purpose then permits the air to enter this upper chamber, and since the air is being withdrawn from the lower chamber the part $B^3$ will be pushed downwardly, so as to close the opening. The water is thus kept in the heater. When the temperature falls below a predetermined point, the connection is open and part of the water is permitted to escape. It will be seen that by making the controllable opening in the valve $B'$ of the right area and regulating the other parts the proper amount of water may be kept in the heater and the temperature regulated automatically in the desired manner.

In Figs. 5 and 6 I have shown an electrically-operated controlling device. In this construction the valve $B'$ is an electrically-operated valve of any desired description, and I have only shown in the drawings a diagrammatic construction for purposes of illustration. The valve $B'$ may be of any suitable construction, and if provided with a movable valve seat and stem, as shown in the drawings, said stem may be associated with a suitable electromagnetic device, so as to be operated thereby under predetermined conditions. As illustrated in Fig. 6, the valve-stem F acts as the core of a solenoid $F'$ and is arranged so that when the solenoid is energized it will be lifted so as to open the connection between the heater and the return-pipe or other dischargeway. The electric conductors $F^2$ and $F^3$ extend from the electromagnetic device $F'$ to the thermostat $B^5$. The conductor $F^2$ is connected to the thermostat proper and the conductor $F^3$ to an opposed contact $F^4$. When the thermostat engages this contact, the circuit is completed and the device $F'$ energized, the movement of the valve is limited by the adjustable part $F^5$, and the parts may be regulated so as to secure the desired opening or to entirely close the valve.

For convenience in illustrating I have shown the parts in such relation that when the room is cold the thermostat $B^5$ is in contact with the part $F^4$, although of course it is evident that the arrangement may be reversed. When the arrangement shown is used, the valve is open when the room is cold because of the energizing of the electromagnetic device $F'$. When the temperature reaches a predetermined point, the part $B^5$ moves away from the part $F^4$, the circuit is then broken, and the valve is closed and keeps the water in the heater. When the temperature again falls, the parts $B^5$ and $F^4$ are brought together and the circuit completed, thus causing the valve to be opened and a part of the water to be withdrawn.

I have shown in detail a particular construction embodying my invention; but it is of course evident that the parts may be varied in many particulars and that some of the parts may be omitted and others used with parts not herein shown without in any manner departing from the spirit of my invention. I therefore do not limit myself to the construction shown, which embodies, however, novel features of construction forming the subject-matter of my pending applications for Letters Patent filed September 20, 1902, Serial No. 124,149; May 31, 1905, Serial No. 262,989, and June 8, 1905, Serial No. 264,205.

It will readily be seen that by a proper adjustment and arrangement of the parts, which will readily occur to those versed in the art, I may by means of the system herein shown economically and satisfactorily heat apartments and properly and accurately regulate the heating effect produced.

It will be noted that by this process the effective temperature of the apartment is the resultant of the heat units simultaneously radiated from the uncondensed steam and from the water of condensation and that by automatically changing the relative volumes of these two heating media in response to the resultant effective temperature in the apartment a substantially uniform temperature may be maintained. This effective resultant temperature possesses the characteristics of the heat produced by steam radiation modified by the characteristics of that produced by the hot-water radiation.

It will be noted that in this system of heating by the automatic retention of water of condensation in the radiator I utilize for effective heating purposes the available heat units of the water, which would otherwise be wasted, and at the same time by controlling the volume of water retained, and consequently the number of heat units thus saved and utilized by the resulting temperature of the apartment, I secure a most efficient method of automatic temperature regulation with the greatest economy in the use of the heating medium.

I have used the terms "water" and "steam;" but it is of course evident that such terms as used in the specification and claim will cover any equivalent material. By converting the water into steam it is put in such a state that it carries itself to the heaters and when there condenses, so as to form water. It is thus utilized as water, and yet the labor necessary to circulate the water in a water system is avoided.

By the phrase "general temperature of the apartment" which I have used in the specification and claim I mean the sensible average or general temperature diffused through the apartment by the heater as distinguished from the temperature due to direct radiation close to the heater, which latter temperature closely approximates the actual temperature of the heating media.

I claim—

The method of economically heating apartments and controlling the temperature thereof, which consists in feeding steam to the top of a radiator, collecting the water of condensation in the lower part of such radiator with avoidance of circulation, and so that the hotter water will remain on the top of the collected volume, controlling the relative volumes of steam and water in, and thereby the heating capacity of, the radiator, by the variations in the general temperature of the apartment acting to intermittently tap off the cooler water in the bottom of the radiator.

HARRY C. MALLORY.

Witnesses:
J. H. McDOWELL,
HART GOODLOE.